(12) United States Patent
Kim et al.

(10) Patent No.: US 12,194,467 B2
(45) Date of Patent: Jan. 14, 2025

(54) GUIDE APPARATUS AND DETECTOR HAVING THE SAME

(71) Applicant: BioTNS Co., Ltd., Daejeon (KR)

(72) Inventors: Bong Suk Kim, Daegu (KR); Byeong Il Kim, Daejeon (KR); Ji Soo Lee, Daejeon (KR); Chan Min Park, Daejeon (KR); Won Rae Lim, Daejeon (KR); Hyeon Woo Kang, Daejeon (KR); So Young Kim, Daejeon (KR); Song Yi Baek, Daejeon (KR); Ji Hyun Choi, Daejeon (KR); Yik Jae Lee, Daejeon (KR)

(73) Assignee: BioTNS Co., Ltd., Daejeon (KR)

( * ) Notice: Subject to any disclaimer, the term of this patent is extended or adjusted under 35 U.S.C. 154(b) by 972 days.

(21) Appl. No.: 17/206,124

(22) Filed: Mar. 19, 2021

(65) Prior Publication Data

US 2022/0203369 A1    Jun. 30, 2022

(30) Foreign Application Priority Data

Dec. 24, 2020    (KR) .......................... 10-2020-0183572

(51) Int. Cl.
*B01L 1/00*    (2006.01)
*B01L 3/00*    (2006.01)

(52) U.S. Cl.
CPC ... *B01L 3/502784* (2013.01); *B01L 3/502715* (2013.01); *B01L 2300/0816* (2013.01); *B01L 2300/0867* (2013.01)

(58) Field of Classification Search
None
See application file for complete search history.

(56) References Cited

U.S. PATENT DOCUMENTS 9,132,394 B2    9/2015   Makarewiez, Jr. et al.
11,045,805 B2*  6/2021   Hung ................ B01L 3/502761
(Continued)

FOREIGN PATENT DOCUMENTS

| JP | S64-26125 A | 1/1989 |
| KR | 10-2043161 B1 | 11/2019 |
| WO | 2010/110842 A1 | 9/2010 |

OTHER PUBLICATIONS

M. Lee et al., Lab Chip, 2014, vol. 14, pp. 509-513.
Notice of Allowance of U.S. Appl. No. 18/589,410 issued on May 1, 2024.

*Primary Examiner* — Jyoti Nagpaul
(74) *Attorney, Agent, or Firm* — INVENSTONE PATENT, LLC

(57) ABSTRACT

Disclosed are an improved guide device capable of being easily replaced for damage, and a detector having the same. The guide device includes a first plate configured to have a plurality of grooves disposed in one surface thereof; and a second plate configured to be in contact with the first plate, wherein the second plate is in contact with the first plate to separate a plurality of channels, wherein the first plate is configured so that the plurality of microdroplets pass through any one of the plurality of channels, the fluid passes through channels facing each other among the plurality of flow channels, and the microdroplets are regularly spaced apart by the fluid that is discharged from the channels facing each other.

7 Claims, 12 Drawing Sheets

(56) References Cited

U.S. PATENT DOCUMENTS

| | | | |
|---|---|---|---|
| 2011/0072914 A1* | 3/2011 | Lebl | ................... F04B 19/006 73/864.11 |
| 2014/0024023 A1 | 1/2014 | Cauley, III et al. | |
| 2016/0016138 A1 | 1/2016 | Hung et al. | |

* cited by examiner

GUIDE APPARATUS AND DETECTOR HAVING THE SAME

CROSS-REFERENCE TO RELATED APPLICATIONS

This application claims the priority benefit of Korean Patent Application No. 10-2020-0183572 filed on Dec. 24, 2020, in the Korean Intellectual Property Office, the disclosure of which is incorporated herein by reference.

BACKGROUND

Technical Field

The present disclosure relates to a guide device and a detector having the same.

Description of the Related Art

A droplet detection system includes a fluid focusing mechanism in which microdroplets are disposed in a direction intersecting with an optical or radiation source to pass through the optical or radiation source.

The fluid focusing mechanism includes a droplet input channel that receives sample-containing microdroplets, and a focusing fluid input channel that receives the microdroplets received in the droplet input channel, and a focusing fluid in contact with the microdroplets to space the microdroplets.

However, in the fluid focusing mechanism, since the droplet input channel and the focusing fluid input channel are integrally formed, if any one of the droplet input channel and the focusing fluid input channel is damaged, it causes the inconvenience of replacing both the droplet input channel and the focusing fluid input channel.

In addition, since the droplet input channel and the focusing fluid input channel are provided in a tubular shape, it is infeasible to prepare for an impact applied to an intersection where the droplet input channel and the focusing fluid input channel meet.

RELATED ART DOCUMENT (Patent Document 1) U.S. Pat. No. 9,132,394 ("SYSTEM FOR DETECTION OF SPACED DROPLETS")

SUMMARY

In order to solve the above problems of the present disclosure, an object of the present disclosure is to provide an improved guide device capable of being easily replaced for damage, and a detector having the same.

In addition, an object of the present disclosure is to provide an improved guide device capable of spacing microdroplets at regular intervals, and a detector having the same.

The subject of the present disclosure is not limited to the problems mentioned above, and other problems that are not mentioned will be clearly understood by those skilled in the art from the following description.

According to an embodiment of the present disclosure, a guide device for receiving a plurality of microdroplets and a fluid in contact with the plurality of microdroplets includes a first plate configured to have a plurality of grooves disposed in one surface thereof; and a second plate configured to be in contact with the first plate, wherein the second plate is in contact with the first plate to separate a plurality of channels, wherein the first plate is configured so that the plurality of microdroplets pass through any one of the plurality of channels, the fluid passes through channels facing each other among the plurality of flow channels, and the microdroplets are regularly spaced apart by the fluid that is discharged from the channels facing each other.

The plurality of grooves may include a first groove configured to separate a first channel into which the plurality of microdroplets are introduced, by contacting the second plate with the first plate; a second groove configured to separate a second channel into which the fluid is introduced, by contacting the second plate with the first plate; a third groove configured to separate a third channel into which the fluid is introduced, by contacting the second plate with the first plate, and have a shape symmetrical to a shape of the second groove with respect to the first groove; and a fourth groove configured to have a fourth channel extending from a joint at which the first channel, the second channel, and third channel meet, by contacting the second plate with the first plate.

The plurality of grooves may be inclinedly configured so that one surfaces and the other surfaces constituting the plurality of grooves gradually open toward the second plate.

The first groove may include a first inlet portion configured to guide the plurality of microdroplets introduced into the first channel; and a first inclined portion connected to the first inlet portion and formed to be inclined so that one surface and the other surface thereof gradually narrow from one end to the other end thereof, and the first inclined portion may be directly connected to the joint.

The second groove may include a second inlet portion configured to guide the fluid introduced into the second channel; a second inclined portion connected to the second inlet portion and formed to be inclined so that one surface and the other surface thereof gradually narrow from one end to the other end thereof; a first contraction portion connected to the second inclined portion and having a width corresponding to a width of a portion connected to the second inclined portion; and a second contraction portion connected to the first contraction portion, and having one side open so that the fluid passing through the second channel is able to be discharged to an outside of the second channel.

The third groove may include a third inlet portion configured to guide the fluid introduced into the third channel; a third inclined portion connected to the third inlet portion and formed to be inclined so that one surface and the other surface thereof gradually narrow from one end to the other end thereof; a third contraction portion connected to the third inclined portion and having a width corresponding to a width of a portion connected to the third inclined portion; and a fourth contraction portion connected to the third contraction portion, and having one side open so that the fluid passing through the third channel is able to be discharged to an outside of the third channel.

The fourth groove may include a fourth inlet portion configured to guide the respective microdroplets that are introduced into the fourth channel; a fourth inclined portion connected to the fourth inlet portion and formed to be inclined so that one surface and the other surface thereof gradually widen from one end to the other thereof; and an expansion portion connected to the fourth inclined portion and having a width corresponding to a width of a portion connected to the fourth inclined portion.

The first inclined portion may be disposed to face the fourth inlet portion, and the second contraction portion may be disposed to face the fourth contraction portion.

The second plate may have a second thickness smaller than a first thickness of the first plate.

According to an embodiment of the present disclosure, a detector configured to be supplied with a plurality of microdroplets and a fluid through a plurality of supply tubes and discharge the plurality of microdroplets and the fluid through a discharge tube, includes a guide device; a main frame configured to fix the guide device thereto; a first connector coupled to the main frame and configured to connect the plurality of supply tubes and the guide device; a second connector coupled to the main frame and configured to connect the discharge tube and the guide device; a first pressing plate configured to cover the first connector so that the first connector is fixed to the main frame; and a second pressing plate configured to cover the second connector so that the second connector is fixed to the main frame.

The main frame may include an exposure hole disposed to expose a portion of the guide device.

The first pressing plate may include a first pressing protrusion formed to protrude from one end thereof and configured to press the plurality of supply tubes.

The second pressing plate may include a second pressing protrusion formed to protrude from one end thereof and configured to press the discharge tube.

According to the present disclosure, since the guide device can be easily detachable from the detector, it is possible to shorten a time for replacement and repair of parts.

In addition, since the plurality of microdroplets are regularly spaced apart by the fluid discharged through the second channel and the third channel, reliability of a gene test using the microdroplets can be improved.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF EMBODIMENTS

Figure 1:
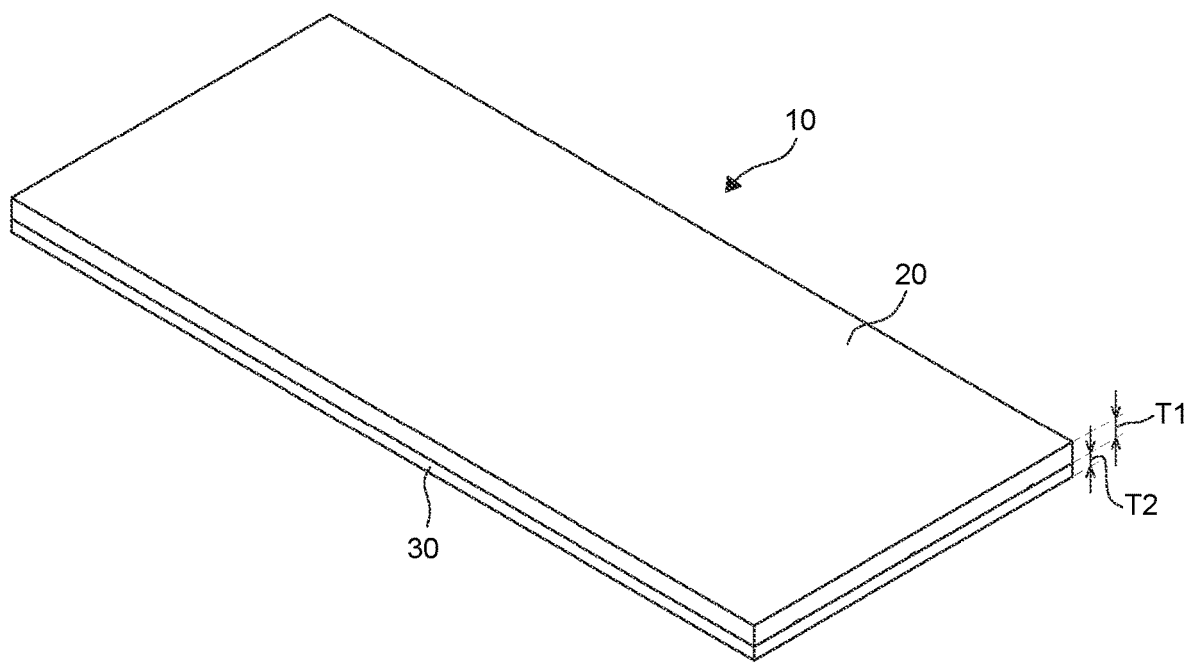
FIG. 1 is a perspective view of a guide device according to an embodiment of the present disclosure.

Embodiments described herein may be variously modified. Specific embodiments may be depicted in the drawings and concretely explained in the detailed description. However, specific embodiments disclosed in the accompanying drawings are only intended to facilitate understanding of various embodiments. Therefore, it is not intended to limit the technical idea to the specific embodiments disclosed in the accompanying drawings, and it should be understood to include all equivalents or substitutes included in the spirit and scope of the invention.

Terms such as "first", "second" and the like may be used to explain various components, but the components should not be limited by the terms. The terms are used only for the purpose of distinguishing one component from another component.

In this specification, it should be understood that the term "include" or "have" indicates that a feature, a number, a step, an operation, a component, a part, or the combination thereof described in the specification is present, but does not exclude a possibility of presence or addition of one or more other features, numbers, steps, operations, components, parts or combinations thereof, in advance. When a component is said to be "connected" or "accessed" to another component, it may be directly connected to or accessed to that other component, but it is to be understood that other components may exist in between. On the other hand, when a component is said to be "directly connected" or "directly accessed" to another component, it should be understood that there is no other component in between.

Meanwhile, "a module" or "a unit, part or portion" for a component used in the specification performs at least one function or operation. And, the "module" or "unit, part or portion" may perform a function or operation by hardware, software, or a combination of hardware and software. In addition, a plurality of "modules" or a plurality of "units, parts or portions" except for modules" or "units, parts or portions" that should be performed in a specific hardware or is performed by at least one processor may be integrated into at least one module. Singular expressions used herein include plural expressions unless they have definitely opposite meanings in the context.

In addition, in the description of the present disclosure, when it is determined that specific description about the related known technique may unnecessarily obscure the gist of the present disclosure, a detailed description thereof is abbreviated or omitted.

Hereinafter, a glass chip will be described in more detail with reference to the accompanying drawings.

Figure 2:
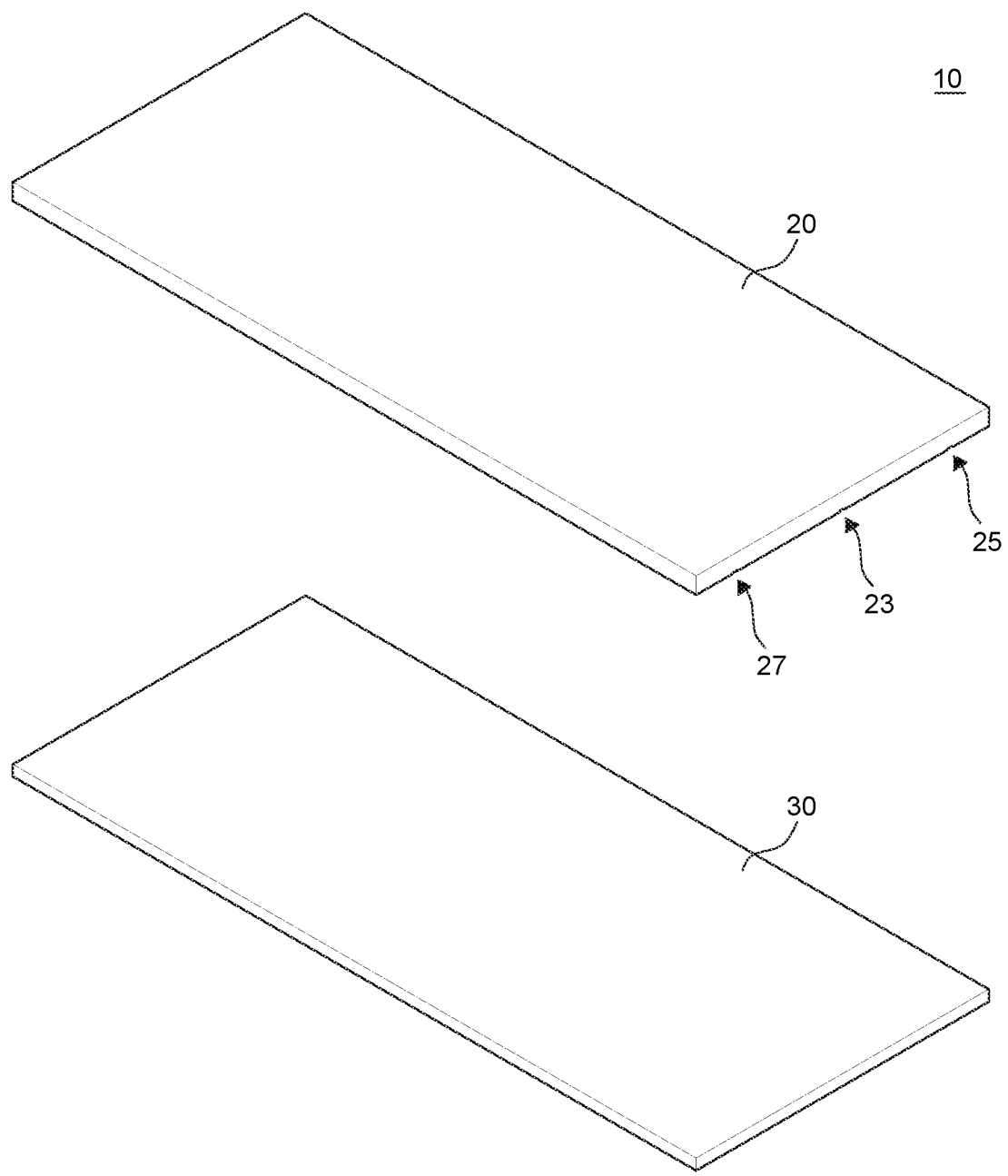
FIG. 2 is an exploded perspective view of a guide device according to an embodiment of the present disclosure.
Figure 3:
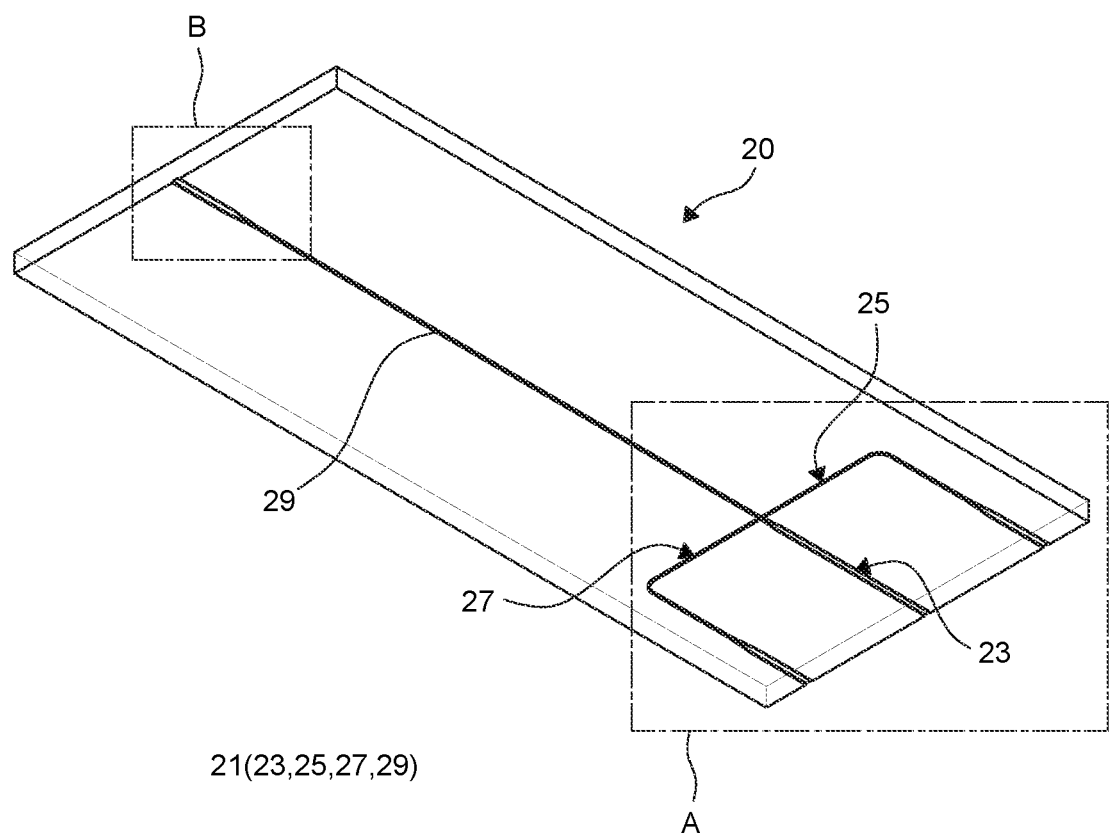
FIG. 3 is an internal perspective view showing an inside of a first plate configuring the guide device according to an embodiment of the present disclosure.
Figure 4:
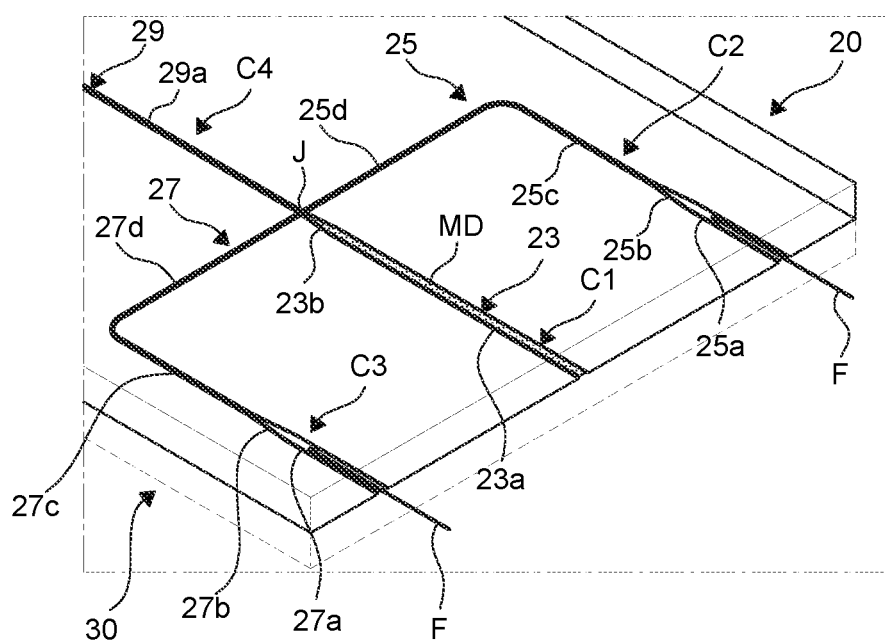
FIG. 4 is an enlarged view showing portion A of FIG. 3.
Figure 5:
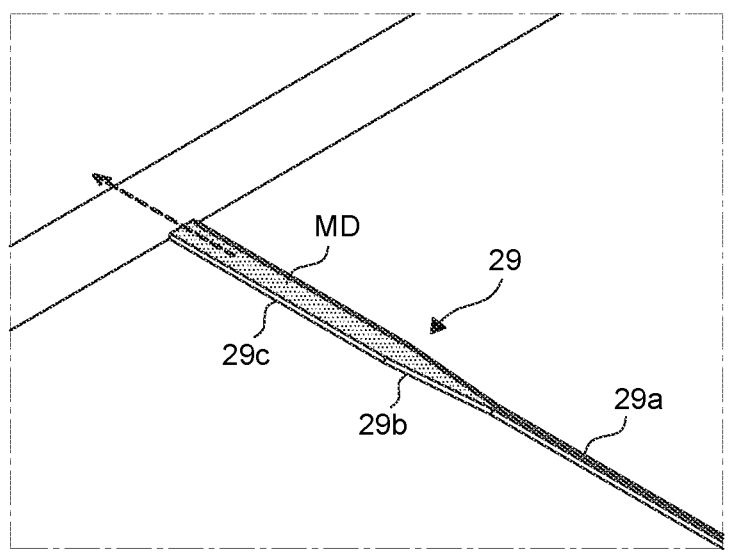
FIG. 5 is an enlarged view showing portion C of FIG. 3.

FIG. 1 is a perspective view of a guide device according to an embodiment of the present disclosure; FIG. 2 is an exploded perspective view of a guide device according to an embodiment of the present disclosure; FIG. 3 is an internal perspective view showing an inside of a first plate configuring the guide device according to an embodiment of the present disclosure; FIG. 4 is an enlarged view showing portion A of FIG. 3; and FIG. 5 is an enlarged view showing portion C of FIG. 3.

A guide device 10 according to an embodiment of the present disclosure receives a plurality of microdroplets MD that are self-replicated through a droplet digital polymerase chain reaction (DDPCR) method, and a fluid F that spaces the plurality of microdroplets MD.

The guide device 10 includes a first plate 20 and a second plate 30.

The first plate 20 is formed of a plastic material such that light emitted from a light source (not shown) for detecting the plurality of microdroplets MD can be transmitted therethrough. However, the present disclosure is not limited thereto, and the second plate 30 may be formed of various materials such as glass, quartz, silicon and the like, through which light can be transmitted.

The first plate 20 is configured to be in contact with the second plate 30. A plurality of grooves 21 are provided to separate a first channel C1, a second channel C2, a third channel C3, and a fourth channel C4 by contacting the second plate 30 with the first plate 20.

The first plate 20 includes the plurality of grooves 21.

The plurality of grooves 21 are formed in one surface of the first plate 20. When the second plate 30 comes into contact with the first plate 20, a portion of the plurality of grooves 21 are covered to be closed by the second plate 30. The plurality of grooves 21, a portion of which are covered by one surface of the second plate 30, separate the first channel C1, the second channel C2, the third channel C3, and the fourth channel C4.

A joint J is formed at a point at which the first channel C1, the second channel C2, the third channel C3, and the fourth channel C4 that are separated by contacting the second plate 30 with the first plate 20 meet one another.

The plurality of microdroplets MD pass through the joint J from the first channel C1 and are introduced into the fourth channel C4, and the fluid F is discharged from the second channel C2 and the third channel C3 and comes into contact with respective microdroplets MD passing through the joint J.

The plurality of grooves 21 include a first groove 23, a second groove 25, a third groove 27, and a fourth groove 29. The plurality of grooves 21 are inclinedly formed such that one surfaces and the other surfaces thereof constituting the plurality of grooves 21 gradually open toward the second plate 30.

The first groove 23 is formed along a longitudinal direction of the first plate 20. The first groove 23, together with one surface of the second plate 30, forms the first channel C1 into which the plurality of microdroplets MD are introduced.

The first groove 23 includes a first inlet portion 23a and a first inclined portion 23b.

The first inlet portion 23a guides the plurality of microdroplets MD that are introduced into the first channel C1.

The first inclined portion 23b is connected to the first inlet portion 23a.

The first inclined portion 23b is inclinedly formed so that one surface and the other surface constituting the first inclined portion 23b gradually narrow from one end to the other end thereof.

In the first inclined portion 23b, as one surface and the other surface constituting the first inclined portion 23b gradually narrow from one end to the other end thereof, the plurality of microdroplets MD are discharged on a one by one basis to the outside of the first channel C1 when passing through the first inclined portion 23b in the first channel C1.

The first inclined portion 23b is connected to a second contraction portion 25d of the second groove 25 and a fourth contraction portion 27d of the third groove 27, and the first inclined portion 23b is disposed to face a fourth inlet portion 29a of the fourth groove 29.

The first inclined portion 23b is directly connected to the joint J. As the first inclined portion 23b is directly connected to the joint J without a separate guide section, intervals of respective microdroplets MD that are discharged to the outside of the first channel C1 may be regularly controlled. If there is a separate guide section between the first inclined portion 23b and the joint J, the respective microdroplets MD may collide inside the guide section, causing damage. When the respective microdroplets MD collide inside the guide section, the intervals of the respective microdroplets MD, which have been regularly maintained, may be reduced or increased, thereby degrading reliability of a gene test.

The second groove 25 is provided in a shape of ']' and is connected to the first groove 23. The second groove 25, together with one surface of the second plate 30, forms the second channel C2 into which the fluid F is introduced. However, shapes of the first and second grooves 25 and 27 are not limited, and the first and second grooves 25 and 27 may be connected to the joint J in various shapes.

The second groove 25 includes a second inlet portion 25a, a second inclined portion 25b, a first contraction portion 25c, and a second contraction portion 25d.

The second inlet portion 25a guides the fluid F that is introduced into the second channel C2.

The second inclined portion 25b is connected to the second inlet portion 25a.

The second inclined portion 25b is inclinedly formed so that one surface and the other surface thereof constituting the second inclined portion 25b gradually narrow from one end to the other end thereof. As one surface and the other surface constituting the second inclined portion 25b are inclinedly formed to gradually narrow from one end to the other end thereof, a velocity of the fluid F that passes through the second inclined portion 25b in the second channel C2 may be gradually increased by Bernoulli's Theorem.

The first contraction portion 25c is connected to the second inclined portion 25b. The first contraction portion 25c has a width corresponding to a width of a portion that is connected to the second inclined portion 25b.

When the width of the first contraction portion 25c is provided to correspond to the width of the portion connected to the second inclined portion 25b, a velocity and pressure of the fluid F passing through the first contraction portion 25c in the second channel C2 may be more increased when the fluid F passes through the second inclined portion 25b in the second channel C2, by Bernoulli's Theorem.

The fluid F that is introduced into the second channel C2 may have a sufficient velocity and pressure capable of temporarily holding respective microdroplets MD that are discharged through the first channel C1, while passing through the first contraction portion 25c.

The second contraction portion 25d is connected to the first contraction portion 25c. One side of the second contraction portion 25d that is not connected to the first contraction portion 25c is formed to open so that the fluid F passing through the second channel C2 can be discharged to the outside of the second channel C2.

The second contraction portion 25d is disposed to face the fourth contraction portion 27d of the third groove 27 and is connected to one surface constituting the first inclined portion 23b of the first groove 23 and one surface constituting the fourth inlet portion 29a of the fourth groove 29.

The third groove 27 is disposed to be spaced apart from the second groove 25 with the first groove 23 therebetween. The third groove 27 has a shape symmetrical to a shape of the second groove 25 with respect to the first groove 23. The third groove 27 is inclinedly formed so that one surface and the other surface constituting the third groove 27 gradually open toward the second plate 30. The second groove 25, together with one surface of the second plate 30, forms the third channel C3 into which the fluid F is introduced.

The third groove 27 includes a third inlet portion 27a, a third inclined portion 27b, a third contraction portion 27c, and the fourth contraction portion 27d.

The third inlet portion 27a guides the fluid F that is introduced into the third channel C3.

The third inclined portion 27b is connected to the third inlet portion 27a.

As one surface and the other surface constituting the third inclined portion 27b gradually narrow from one end to the other end thereof, a velocity of the fluid F that passes through the third inclined portion 27b in the third channel C3 may be gradually increased by Bernoulli's Theorem.

The third contraction portion 27c is connected to the third inclined portion 27b. The third contraction portion 27c has a width corresponding to a width of a portion that is connected to the third inclined portion 27b.

When the width of the third contraction portion 27c is provided to correspond to the width of the portion connected to the third inclined portion 27b, a velocity and pressure of the fluid F passing through the third contraction portion 27c in the third channel C3 may be more increased when the fluid F passes through the third inclined portion 27b in the third channel C3, Bernoulli's Theorem.

The fluid F that is introduced into the third channel C3 may have a sufficient velocity and pressure capable of temporarily holding respective microdroplets MD that are discharged through the first channel C1, while passing through the third contraction portion 27c.

The fourth contraction portion 27d is connected to the third contraction portion 27c. One side of the fourth contraction portion 27d that is not connected to the third contraction portion 27c is formed to be open so that the fluid F passing through the third channel C3 can be discharged to the outside of the third channel C3.

The fourth contraction portion 27d is disposed to face the second contraction portion 25d of the second groove 25 and is connected to the other surface constituting the first inclined portion 23b of the first groove 23 and the other surface constituting the fourth inlet portion 29a of the fourth groove 29.

The fourth groove 29 is provided so that respective microdroplets MD discharged through the first channel C1 are introduced therein and are discharged to the outside of the first plate 20 and the second plate 30.

The fourth groove 29, together with one surface of the second plate 30, forms the fourth channel C4.

The fourth groove 29 includes a fourth inlet portion 29a, a fourth inclined portion 29b, and an expansion portion 29c.

The fourth inlet portion 29a guides respective microdroplets MD that are introduced into the fourth channel C4. The fourth inlet portion 29a is disposed to face the first inclined portion 23b of the first groove 23.

The fourth inclined portion 29b is connected to the fourth inlet portion 29a. The fourth inclined portion 29b is inclinedly formed so that one surface and the other surface constituting the fourth inclined portion 29b gradually widen from one end to the other end thereof. Respective microdroplets MD of which detection has terminated while passing through the fourth inlet portion 29a, may be guided to be introduced into the expansion portion 29c through the fourth inclined portion 29b.

The expansion portion 29c is connected to the fourth inclined portion 29b. The expansion portion 29c has a width corresponding to a width of a portion connected to the fourth inclined portion 29b. The expansion portion 29c is provided to receive respective microdroplets MD of which detection has terminated, that are introduced through the fourth inclined portion 29b from the fourth inlet portion 29a. The plurality of microdroplets MD received in the expansion portion 29c are discharged to the outside of the first plate 20 and the second plate 30 to be discarded or reused.

The second plate 30 is configured to be in contact with the first plate 20. The second plate 30 closes a portion of the plurality of grooves 21 of the first plate 20 so that the first channel C1, the second channel C2, the third channel C3, and the fourth channel C4 may be formed.

The second plate 30 may be formed of a transparent glass material so that light emitted from a light source (not shown) for detecting a plurality of microdroplets MD can be transmitted therethrough. However, the present disclosure is not limited thereto, and the second plate 30 may be formed of various materials capable of transmitting light therethrough.

The second plate 30 has a second thickness T2 smaller than a first thickness T1 of the first plate 30.

When the second thickness T2 of the second plate 30 is smaller than the first thickness T1 of the first plate 30, less refraction of light emitted from a light source (not shown) for detecting the microdroplets MD that pass through the fourth channel C4 occurs, so that the light may accurately reach respective microdroplets MD, thereby allowing for improvements in reliability of a gene test.

The fluid F discharged through the second channel C2 and the third channel C3 pressurizes respective microdroplets MD that pass through the first channel C1. The respective microdroplets MD may be temporarily held while shapes thereof are distorted due to pressurization by the fluid F. An interval between the microdroplet MD that is temporarily held by the fluid F and the microdroplet MD that passes through the fluid F and is introduced into the fourth channel C4 is increased by the microdroplet MD that is temporarily held by the fluid F.

In addition, the guide device 10 temporarily holds the microdroplets MD by the fluid F discharged from the second channel C2 and the third channel C3. Accordingly, the guide device 10 may secure a time during which the microdroplets MD that are introduced into the fourth channel C4 can be detected by a light source (not shown) while passing through the fourth channel C4.

Hereinafter, a detector will be described in more detail with reference to the accompanying drawings.

Figure 6:
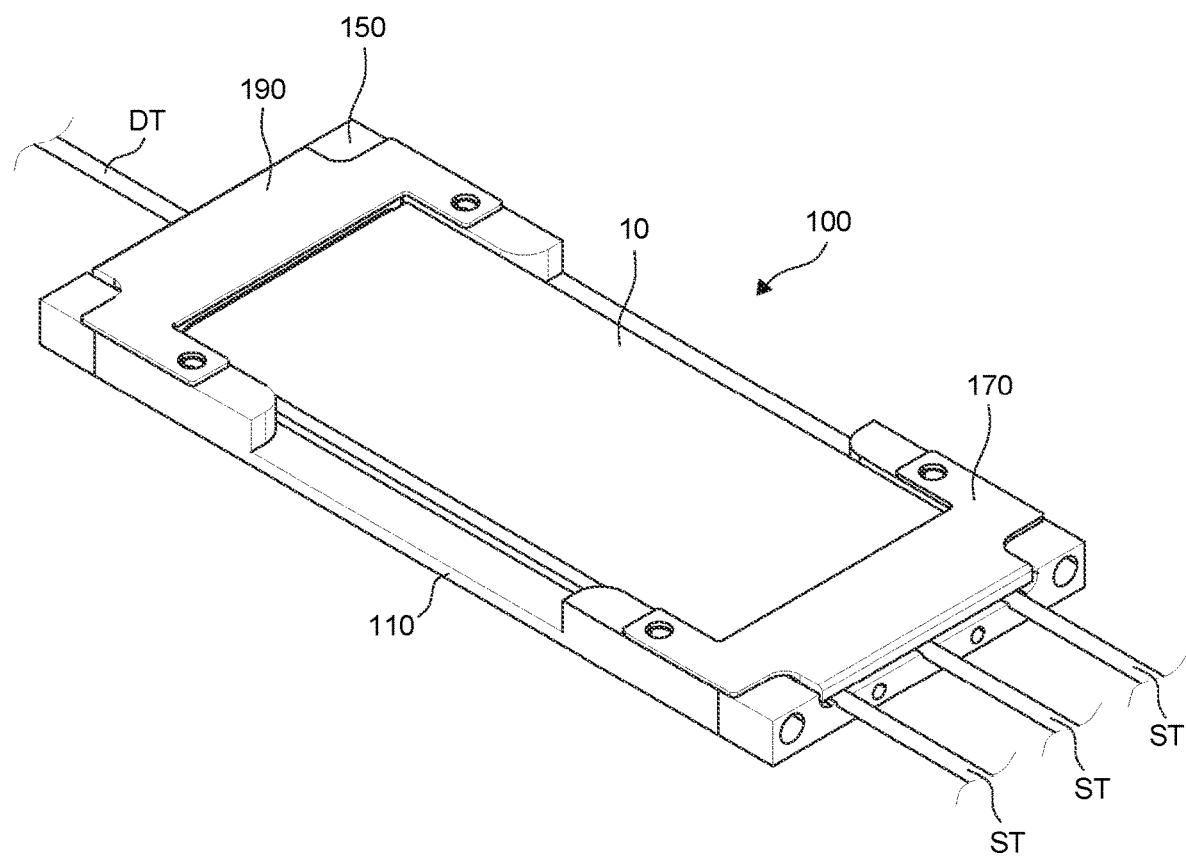
FIG. 6 is a perspective view of a detector according to an embodiment of the present disclosure.
Figure 7:
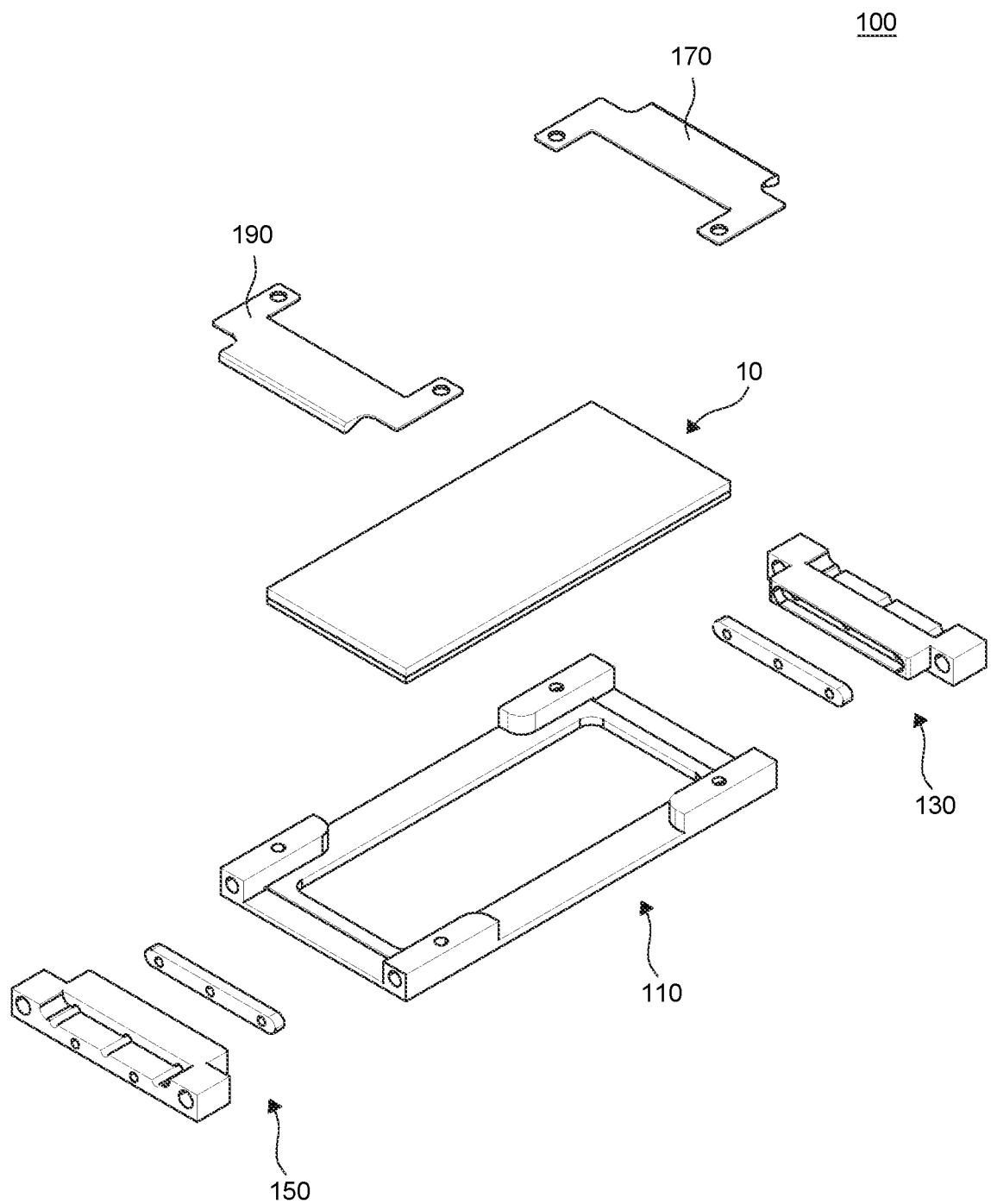
FIG. 7 is an exploded perspective view of the detector according to an embodiment of the present disclosure.

FIG. 6 is a perspective view of a detector according to an embodiment of the present disclosure, and FIG. 7 is an exploded perspective view of the detector according to an embodiment of the present disclosure.

Referring to FIGS. 6 and 7, a detector 100 according to an embodiment of the present disclosure fixes the guide device 10 thereto so that the guide device 10 does not shake. The detector 100 is provided to secure a plurality of supply tubes ST for supplying a plurality of microdroplets MD and a fluid F and a discharge tube DT that is provided to discard used oil or the plurality of microdroplets MD of which detection has terminated.

The detector 100 temporarily holds respective microdroplets MD that are supplied to the first channel C1 by the fluid F supplied to the second channel C2 and the third channel C3, respectively.

The detector 100 includes the guide device 10, a main frame 110, a first connector 130, a second connector 150, a first pressing plate 170 and a second pressing plate 190.

Since the guide device 10 has the same configuration as the guide device 10 according to an embodiment of the present disclosure, a description thereof will be omitted.

Figure 8:
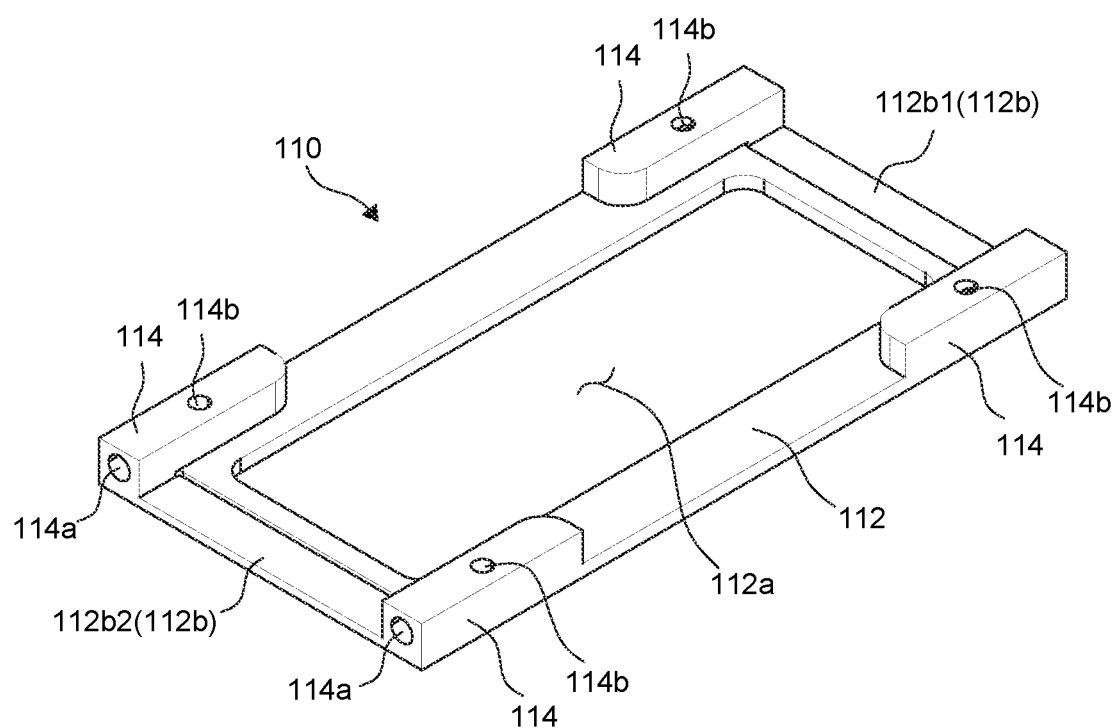
FIG. 8 is a perspective view of a main frame included in the detector according to an embodiment of the present disclosure.

FIG. 8 is a perspective view of a main frame included in the detector according to an embodiment of the present disclosure.

Referring to FIG. 8, the main frame 110 fixes the guide device 10 thereto and is provided so that light emitted from a light source (not shown) may reach respective microdroplets MD.

The main frame 110 includes a base plate 112 and a plurality of pillars 114.

The base plate 112 is provided so that the guide device 10 is seated and fixed thereto. In a portion of the base plate 112, an exposure hole 112a is disposed to expose a portion of the second plate 30 of the guide device 10 so that light emitted from a light source (not shown) reaches the plurality of microdroplets MD that passes through the fourth channel C4 of the base plate 112.

The base plate 112 includes a connector seating surface 112b.

The connector seating surface 112b is formed on one side and the other side of the base plate 112.

The connector seating surface 112b includes a first seating surface 112b1 and a second seating surface 112b2.

A first connector 130 is seated on the first seating surface 112b1.

A second connector 150 is seated on the second seating surface 112b2.

The plurality of pillars 114 are formed to protrude from one surface of the base plate 112. The plurality of pillars 114 has a height corresponding to a height of the guide device 10 so that one side and the other side of the guide device 10 are in contact with the pillars 114 to allow the guide device 10 to be fixed to the main frame 110.

The plurality of pillars 114 includes a plurality of first fixing grooves 114a and a plurality of second fixing grooves 114b.

The plurality of first fixing grooves 114a are provided in one ends of the respective pillars 114. The plurality of first fixing grooves 114a are in communication with a plurality of first fixing holes 114a of the first connector 130 and a plurality of second fixing holes 152a of the second connector 150 so that the first connector 130 and the second connector 150 can be fixed to the main frame 110.

The plurality of second fixing grooves 114b are provided in upper surfaces of the respective pillars 114. The plurality of second fixing grooves 114b are in communication with third fixing holes 172 of the first pressing plate 170 so that the first pressing plate 170 can be coupled to the main frame 110. In addition, the plurality of second fixing grooves 114b are in communication with fourth fixing holes 192 of the second pressing plate 190 so that the second pressing plate 190 can be coupled to the main frame 110.

Figure 9:
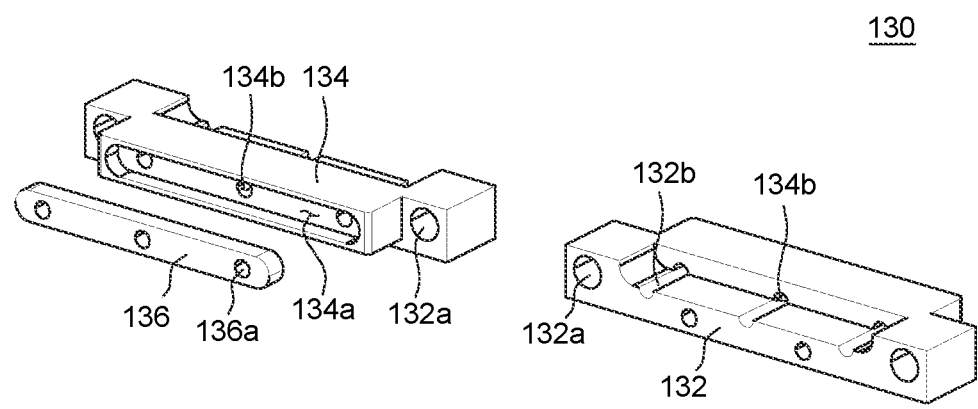
FIG. 9 is a perspective view of a first connector included in the detector according to an embodiment of the present disclosure.

FIG. 9 is a perspective view of a first connector included in the detector according to an embodiment of the present disclosure.

Referring to FIG. 9, the first connector 130 is coupled to the main frame and is seated on the first seating surface 112b1 of the connector seating surface 112b. The first connector 130 connects the plurality of supply tubes ST and the guide device 10. The plurality of supply tubes ST are provided to supply the plurality of microdroplets MD and fluid F to the first channel C1 to the third channel C3.

The first connector 130 includes a first body 132 and a second body 134, and a first sealing block 136.

The first body 132 is connected to the plurality of supply tubes ST, and is in contact with the plurality of pillars 114 so that the first connector 130 is coupled to the base plate 112.

The first body 132 includes a plurality of first fixing holes 132a and a plurality of first tube receiving grooves 132b.

The plurality of first fixing holes 132a are provided in one side and the other side of the first body 132. The plurality of first fixing holes 132a are in communication with the plurality of first fixing grooves 114a of the pillars 114. When a coupling member (not shown) is received in the plurality of first fixing holes 132a and the plurality of first fixing grooves 114a of the pillars 114, the first connector 130 may be fixed to the base plate 112.

The plurality of first tube receiving grooves 132b receive the plurality of supply tubes ST and cover one ends of the plurality of supply tubes ST. The plurality of first tube receiving grooves 132b are connected to a plurality of first supply holes 134b of the second body 134. Accordingly, the plurality of supply tubes ST received in the plurality of first tube receiving grooves 132b may be in communication with the plurality of first supply holes 134b of the second body 134.

The second body 134 is formed to extend from one end of the first body 132. The second body 134 is disposed between the plurality of pillars 114. Since the second body 134 is disposed between the plurality of pillars 114 and may be fixed without shaking leftward or rightward with respect to the main frame 110, the plurality of microdroplets MD and the fluid F may be stably supplied to the first channel C1, the second channel C2, and the third channel C3 through the plurality of supply tubes ST.

The second body 134 includes a first sealing block receiving groove 134a and a plurality of first supply holes 134b.

The first sealing block receiving groove 134a is formed to be recessed inwardly from one surface of the second body 134. The first sealing block 136 is received in the first sealing block receiving groove 134a.

The plurality of first supply holes 134b are formed to be penetrated from one surface that configures the first sealing block receiving groove 134a so as to be connected to the plurality of first tube receiving grooves 132b. The plurality of first supply holes 134b are connected to the plurality of first tube receiving grooves 132b and are in communication with a plurality of second supply holes 136a of the first sealing block 136.

The first sealing block 136 is received in the first sealing block receiving groove 134a of the second body 134. The first sealing block 136 is provided so that the plurality of microdroplets MD and fluid F that are supplied from the plurality of supply tubes ST to the first channel C1 to the third channel C3 are not discharged to the outside of the first connector 130 or the main frame 110.

The first sealing block 136 includes the plurality of second supply holes 136a. The plurality of second supply holes 136a are formed to be penetrated from one end to the other end of the first sealing block 136. The plurality of second supply holes 136a are connected to the plurality of first supply holes 134b and the first groove 23, the second groove 25, and the third groove 27 of the first plate 20 of the guide device 10.

The second connector 150 is seated on the second seating surface 112b2 of the connector seating surface 112b. The second connector 150 connects the discharge tube DT and the guide device 10. The discharge tube DT is provided to discharge the fluid F and plurality of microdroplets MD of which detection has terminated, that are discharged through the fourth channel C4, to the outside of the detector 100.

Figure 10:
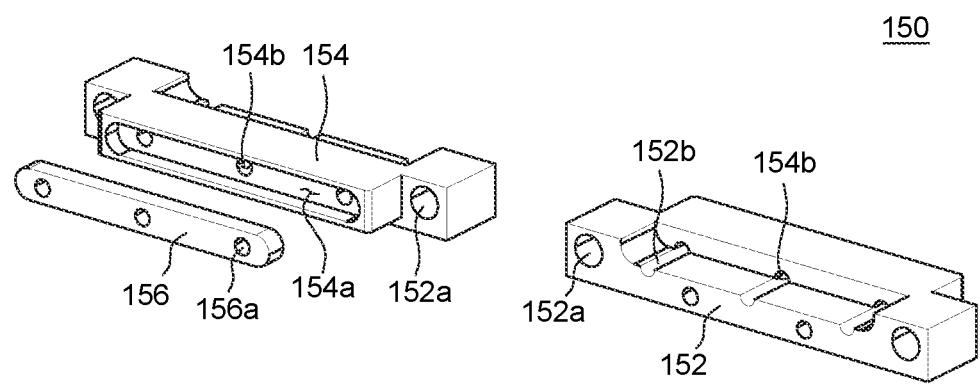
FIG. 10 is a perspective view of a second connector included in the detector according to an embodiment of the present disclosure.

FIG. 10 is a perspective view of a second connector included in the detector according to an embodiment of the present disclosure.

Referring to FIG. 10, the second connector 150 includes a third body 152 and a fourth body 154, and a second sealing block 156.

The third body 152 is connected to the discharge tube DT and is in contact with the plurality of pillars 114 so that the second connector 150 is coupled to the base plate 112.

The third body 152 includes a plurality of second fixing holes 152a and a plurality of second tube receiving grooves 152b.

The plurality of second fixing holes 152a are provided in one side and the other side of the third body 152. The plurality of second fixing holes 152a are in communication with the plurality of first fixing grooves 114a of the pillars 114. When a coupling member (not shown) is received in the plurality of second fixing holes 152a and the plurality of first fixing grooves 114a of the pillars 114, the second connector 150 may be fixed to the base plate 112.

The plurality of second tube receiving grooves 152b receive the discharge tube DT and cover one end of the discharge tube DT. The plurality of second tube receiving grooves 152b are connected to any one of a plurality of first discharge holes 154b of the fourth body 154. Accordingly, the discharge tube DT received in the plurality of second tube receiving grooves 152b may be in communication with any one of the plurality of first discharge holes 154b of the fourth body 154.

The fourth body 154 is formed to extend from one end of the third body 152. The fourth body 154 is disposed between the plurality of pillars 114. Since the fourth body 154 is disposed between the plurality of pillars 114 and may be fixed without shaking leftward or rightward with respect to the main frame 110, the plurality of microdroplets MD and the fluid
F may be stably discharged to the fourth channel C4 through the discharge tube DT.

The fourth body 154 includes a second sealing block receiving groove 154a and the plurality of first discharge holes 154b.

The second sealing block receiving groove 154a is formed to be recessed inwardly from one surface of the fourth body 154. The second sealing block 156 is received in the second sealing block receiving groove 154a.

The plurality of first discharge holes 154b are formed to be penetrated from one surface that configures the second sealing block receiving groove 154a so as to be connected to the plurality of second tube receiving grooves 152b. The plurality of first discharge holes 154b are connected to the plurality of second tube receiving grooves 152b and are in communication with a plurality of second discharge holes 156a of the second sealing block 156.

The second sealing block 156 is received in the second sealing block receiving groove 154a of the fourth body 154. The second sealing block 156 is provided so that the plurality of microdroplets MD and fluid F that are discharged from the fourth channel C4 to the discharge tube DT are not discharged to the outside of the second connector 150 or the main frame 110.

The second sealing block 156 includes the plurality of second discharge holes 156a. The plurality of second discharge holes 156a are formed to be penetrated from one end to the other end of the second sealing block 156. The plurality of second discharge holes 156a are connected to the plurality of first discharge holes 154b and the fourth groove 29 of the guide device 10.

Figure 11:
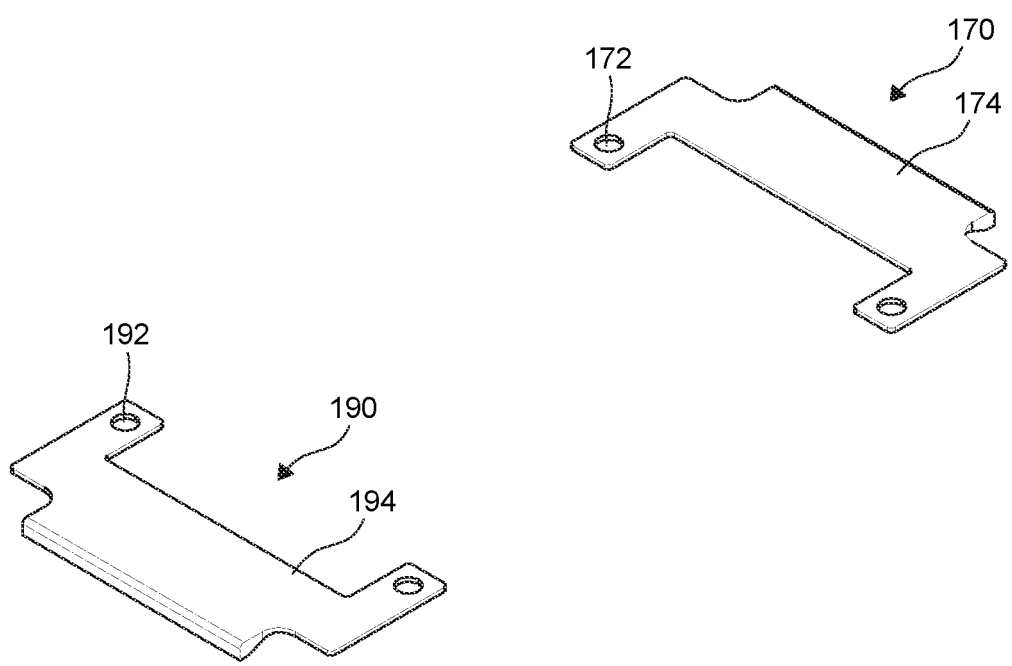
FIG. 11 is a perspective view of a first pressing plate and a second pressing plate included in the detector according to an embodiment of the present disclosure.

FIG. 11 is a perspective view of a first pressing plate and a second pressing plate included in the detector according to an embodiment of the present disclosure.

Referring to FIG. 11, the first pressing plate 170 simultaneously covers the first connector 130 and two pillars 114 among the plurality of pillars 114 so that the first connector 130 is fixed to the main frame 110.

The first pressing plate 170 includes a third fixing hole 172 and a first pressing protrusion 174.

The third fixing hole 172 is in communication with the plurality of second fixing grooves 114b of the plurality of pillars 114. The first pressing plate 170 is coupled to the main frame 110 through a coupling member (not shown) received in the third fixing hole 172 and the plurality of second fixing grooves 114b, and the first pressing plate 170 may be fixed to the main frame 110.

The first pressing protrusion 174 is formed to protrude from one end of the first pressing plate 170. The first pressing protrusion 174 presses the plurality of supply tubes ST received in the plurality of first tube receiving grooves 132b. Accordingly, the plurality of supply tubes ST are strongly fixed by the first pressing protrusion 174 and does not separate from the detector 100.

The second pressing plate 190 simultaneously covers the second connector 150 and the other two pillars 114 that are not covered by the first pressing plate 170 among the plurality of pillars 114 so that the first connector 130 is fixed to the main frame 110.

The second pressing plate 190 includes a fourth fixing hole 192 and a second pressing protrusion 194.

The fourth fixing hole 192 is in communication with the plurality of second fixing grooves 132b of the plurality of pillars 114. The second pressing plate 190 is coupled to the main frame 110 through a coupling member (not shown) received in the fourth fixing hole 192 and the plurality of second fixing grooves 132b, and the second pressing plate 190 may be fixed to the main frame 110.

The second pressing protrusion 194 is formed to protrude from one end of the second pressing plate 190. The second pressing protrusion 194 presses the discharge tube DT received in the plurality of second tube receiving grooves 152b. Accordingly, the discharge tube DT is strongly fixed by the second pressing protrusion 194 and does not separate from the detector 110.

Hereinafter, a flow system will be described.

Figure 12:
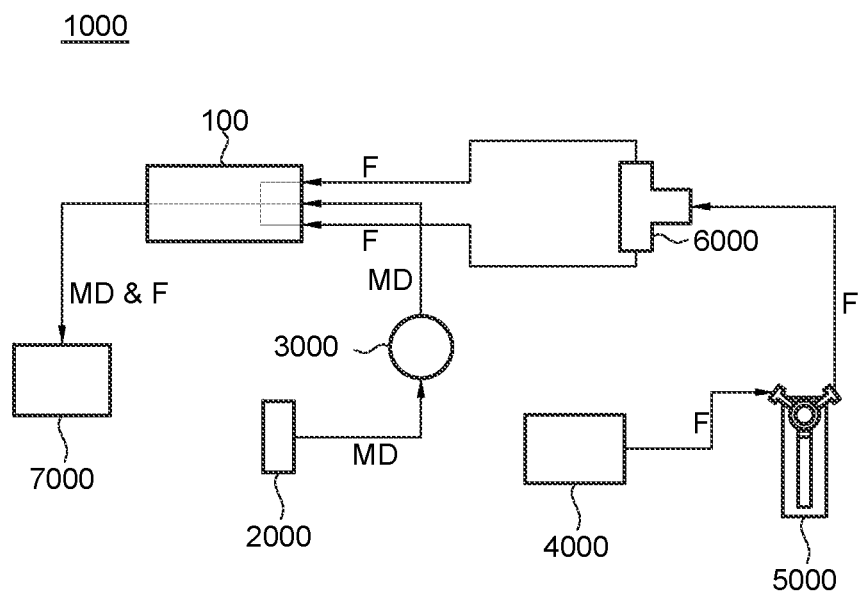
FIG. 12 is a schematic diagram for explaining a flow system including the detector according to an embodiment of the present disclosure.

FIG. 12 is a schematic diagram for explaining a flow system including the detector according to an embodiment of the present disclosure.

Referring to FIG. 12, a flow system for guiding a plurality of microdroplets and a fluid includes the detector 100, a droplet generating device 2000, a first valve 3000, a fluid tank 4000, a supply pump 5000, a second valve 6000, and a disposal device 7000.

Since the detector 100 has the same configuration as the detector 100 according to an embodiment of the present disclosure, a description thereof will be omitted.

The droplet generating device 2000 is configured to generate microdroplets MD using a sample and oil stored therein.

The first valve 3000 is configured to transfer the microdroplets MD generated by the droplet generating device 1000 to the first channel C1 of the detector 100.

The fluid tank 4000 stores a fluid F provided to space the respective microdroplets MD that flow into the detector 100.

The supply pump 5000 is configured to receive the fluid F from the fluid tank 4000 and transfer it to the second valve 6000.

The second valve 6000 is configured to transfer the fluid F that is transferred from the supply pump 5000 to the detector 100.

The second valve 6000 includes a first supply unit 6200 and a second supply unit 6400.

The first supply unit 6200 is configured to supply the fluid F to the second channel C2 of the detector 100.

The second supply 6400 is configured to supply the fluid F to the third channel C3 of the detector 100.

The disposal device 7000 is configured such that a plurality of microdroplets MD and fluid F of which detection has been terminated while passing through the detector 100 may be discarded.

Referring to FIG. 12, the flow system 1000 transmits the plurality of microdroplets MD that are generated by the droplet generating device 2000 to the first channel C1 of the detector 100 through the first valve 3000.

When the plurality of microdroplets MD are transferred to the first channel C1 of the detector 100, the supply pump 5000 that has received the fluid F from the fluid tank 4000 transfers the fluid F to the second valve 6000

The second valve 6000 that has received the fluid F transfers the fluid F to the second channel C2 of the detector 100 through the first supply unit 6200, and transfers the fluid F to the third channel C3 of the detector 100 through the second supply unit 6400.

The plurality of microdroplets MD and fluid F of which detection has terminated while passing through the fourth channel C of the detector 100, are discharged to the outside of the detector 100 and transferred to the disposal device 7000. The plurality of microdroplets MD and fluid F that are transferred to the disposal device 7000 are discarded.

Although the embodiments of the present disclosure have been described in detail with reference to the accompanying drawings, it is to be understood that the present disclosure is not limited to those embodiments and various changes and modifications may be made without departing from the scope of the present disclosure. Therefore, the embodiments disclosed in the present disclosure are intended to illustrate rather than limit the scope of the present disclosure, and the scope of the technical idea of the present disclosure is not limited by these embodiments. Therefore, it should be understood that the above-described embodiments are illustrative in all aspects and not restrictive. The scope of the present disclosure should be construed according to the claims, and all technical ideas within the scope of equivalents should be construed as falling within the scope of the present disclosure.

What is claimed is:

1. A guide plate providing one or more microchannels in which microdroplets and one or more fluids flow, the guide plate comprising:
   a first plate having a first surface in which a plurality of grooves are formed, the plurality of grooves including a first groove, at least one second groove, and a third groove; and
   a second plate having a second surface in which no grooves are formed, the second plate formed of an optically transparent material allowing light to pass through the second plate from a light source,
   wherein the guide plate is formed by joining the first surface of the first plate and the second surface of the second plate, to form in the guide plate each of (i) a droplet inlet, at least one fluid inlet, and an outlet, (ii) a first microchannel extending between the droplet inlet and a junction by the first groove, (iii) at least one second microchannel extending between the at least one fluid inlet and the junction by the at least one second groove, and (iv) a third microchannel extending between the junction and the outlet by the third groove,
   wherein the first microchannel, the at least one second microchannel, and the third microchannel meet in the junction such that the microdroplets are separated in the third microchannel after the microdroplets coming from the first microchannel meet the one or more fluids coming from the at least one second microchannel at the junction, and
   wherein the third microchannel is illuminated by the light passing through the second plate.

2. The guide plate of claim 1, wherein opposite surfaces of each of the plurality of grooves are inclinedly formed so that the plurality of grooves gradually open toward the second plate.

3. The guide plate of claim 1, wherein the first groove includes:
   a first inlet portion configured to guide the microdroplets introduced into the first channel; and
   a first inclined portion connected to the first inlet portion and formed to be inclined so that opposite surfaces of the first inclined portion gradually narrow from one end to the other end of the first inclined portion, the first inclined portion directly connected to a groove corresponding to the junction.

4. The guide plate of claim 1, wherein each of the at least one second groove includes:
   a second inlet portion configured to guide the one or more fluids introduced into one of the at least one second microchannel;
   a second inclined portion connected to the second inlet portion and formed to be inclined so that opposite surfaces of the second inclined portion gradually narrow from one end to the other end of the second inclined portion;
   a first contraction portion connected to the second inclined portion and having a width corresponding to a width of a portion connected to the second inclined portion; and
   a second contraction portion connected to the first contraction portion and having one side open so that the one or more fluids passing through the one of the at least one second microchannel is able to be discharged to an outside of the one of the at least one second microchannel.

5. The guide plate of claim 1, wherein the third groove includes:
   a third inlet portion configured to guide the microdroplets that are introduced into the third microchannel;
   a third portion connected to the third inlet portion and formed to be inclined so that opposite surfaces of the third inclined portion gradually widen from one end to the other of the third microchannel; and
   an expansion portion connected to the third inclined portion and having a width corresponding to a width of a portion connected to the third inclined portion.

6. The guide plate of claim 1, wherein the second plate has a second thickness smaller than a first thickness of the first plate.

7. An apparatus for detecting microdroplets, the apparatus comprising:

a guide plate comprising:
- a first plate having a first surface in which are formed a first groove, at least one second groove, and a third groove; and
- a second plate having a second surface in which no grooves are formed, the second plate formed of an optically transparent material allowing light to pass through the second plate from a light source, wherein the guide plate is formed by joining the first surface of the first plate and the second surface of the second plate, to form in the guide plate each of (i) a droplet inlet, at least one fluid inlet, and an outlet, (ii) a first microchannel extending between the droplet inlet and a junction by the first groove, (iii) at least one second microchannel extending between the at least one fluid inlet and the junction by the at least one second groove, and (iv) a third microchannel extending between the junction and the outlet by the third groove, and wherein the first microchannel, the at least one second microchannel, and the third microchannel meet in the junction such that the microdroplets are separated in the third microchannel after the microdroplets coming from the first microchannel meet the one or more fluids coming from the at least one second microchannel at the junction;

a frame comprising a support surface to seat the guide plate, the support surface comprising at least one exposure hole configured to expose a portion of the guide plate such that the third microchannel is exposed to the light passing through the second plate, the support surface further comprising a remaining portion of the support surface other than the at least one exposure hole, the remaining portion configured to cover a remaining portion of the guide plate other than the portion of the guide plate such that the remaining portion of the guide plate is not exposed to the light passing through the second plate; and a first connector and a second connector which are configured to couple the frame and the guide plate, the first connector having a first hole enabling a fluidical connection between the droplet inlet and a droplet providing tube and at least one second hole enabling a fluidical connection between the at least one fluid inlet and at least one fluid providing tube, the second connector having a third hole enabling a fluidical connection between the outlet and a discharging tube.

* * * * *